Figure 1:
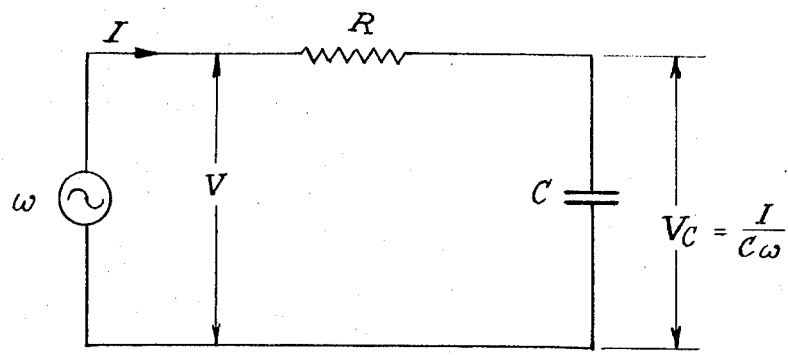

United States Patent
Shawhan

[15] 3,648,165
[45] Mar. 7, 1972

[54] CAPACITANCE-MEASURING APPARATUS INCLUDING MEANS MAINTAINING THE VOLTAGE ACROSS THE UNKNOWN CAPACITANCE CONSTANT

[72] Inventor: Elbert N. Shawhan, West Chester, Pa.
[73] Assignee: Sun Oil Company, Philadelphia, Pa.
[22] Filed: Sept. 24, 1970
[21] Appl. No.: 75,077

[52] U.S. Cl. ........................................................324/60 R
[51] Int. Cl. .........................................................G01r 11/52
[58] Field of Search .............................................324/60, 61

[56] References Cited

UNITED STATES PATENTS 3,458,803  7/1969  Maguire..................................324/60

*Primary Examiner*—Edward E. Kubasiewicz
*Attorney*—George L. Church, Donald R. Johnson, Wilmer E. McCorquodale and Frank A. Rechif

[57] ABSTRACT

The total voltage across a series resistance-capacitance circuit (wherein the capacitance is that of a measuring probe) supplied by an alternating current source is controlled so as to maintain the voltage across the capacitance constant as the measured capacitance varies. This provides a linear total voltage-capacitance characteristic over a wide capacitance range. The effects of temperature and aging on component values are eliminated by continuously correcting the slope of the voltage-capacitance characteristic.

15 Claims, 3 Drawing Figures

INVENTOR:
ELBERT NEIL SHAWHAN
BY
ATTY.

CAPACITANCE-MEASURING APPARATUS INCLUDING MEANS MAINTAINING THE VOLTAGE ACROSS THE UNKNOWN CAPACITANCE CONSTANT

This invention relates to capacitance-measuring apparatus, and more particularly to circuitry useful for measuring the capacitance presented by a measuring probe which is responsive to physical changes. Thus, it relates to capacitive-type measurement.

One of the main fields of use of capacitive-type measurement comprises the measurement of level. There is little difficulty in measuring the level of most clean, nonconducting liquids. Accuracy is generally limited by the effects of temperature and composition changes on the dielectric constant of the liquid being measured.

Level measurement of conducting material requires either a probe with an insulating coating, or use of a high measuring frequency. A coated probe in a low-frequency system may be vulnerable to error from a film clinging to the probe surface. In some materials, there will be an error if the measuring frequency is not constant.

Measurement of level in granular material such as catalysts may involve error due to the effects of changes in temperature or in measuring frequency on the dielectric constant of the solid catalyst.

Capacitive-type measurement is also useful in indicating packing fraction of powders, presence of foam on liquids, thickness of insulating material, or the spacing of metal surfaces. Applications of this type usually require stable operation over a narrow span.

Composition changes in a mixture can be followed, using capacitive measurements, if only one component is changing. A special case of this type is the measurement of suspended water in oil (known as B.S. & W. measurement). Capacitance measurement can also determine the percent of suspended oil in water, if a very high measuring frequency is used.

A common procedure for detecting the interface between different materials in a pipeline involves the use of apparatus which continuously monitors the dielectric constant of the stream.

A special application of capacitance measurement indirectly determines the dissolved water in a liquid, as a percent of saturation. The capacitance-measuring apparatus measures the dielectric constant of the water film formed over the surface of a desiccant immersed in the liquid. Here, a low measuring frequency is required for greatest sensitivity.

In view of the above discussion relating to the various uses or applications of capacitance measuring apparatus, it should be appreciated that such apparatus should permit adaptation to the various applications with minimum deviations from a standard model. This desideratum has been met according to the present invention by constructing the electronic components as plug-in units, such that they can easily be replaced.

Available solid-state integrated circuit modules are employed in the apparatus of the present invention; these enable most of the circuit components to be mounted in a compact package at the point of measurement, that is, near the sensing probe. As a result, there are no high-frequency connections between the point of measurement and the (remotely located) recording or control device, so that frequencies up to several mHz. may be used as required.

Desirably, span and zero adjustments should be available at a convenient location; according to this invention, they are located in the recorder package, and they operate without interaction.

A maximum span of at least 1,000 pf. is desirable, and the output voltage should be linear with capacitance over this range. The present invention provides an output voltage which is accurately linear with capacitance over a range in excess of 2,000 pf.

A major problem is compensating for the effects of temperature and aging on the characteristics of the solid-state devices, and on other component values. According to the invention, this problem is solved by using an internal capacitance standard which is periodically introduced into the measuring portion of the circuit, the effect of which is to continuously correct the slope of the voltage-capacitance relation.

Figure 2:
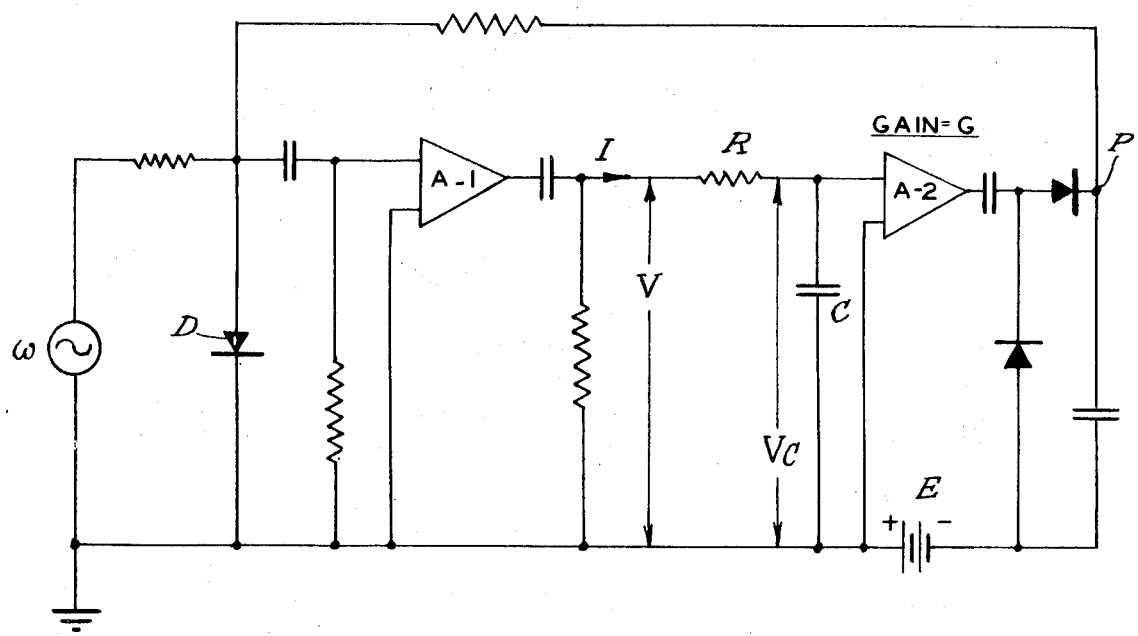
Figure 3:
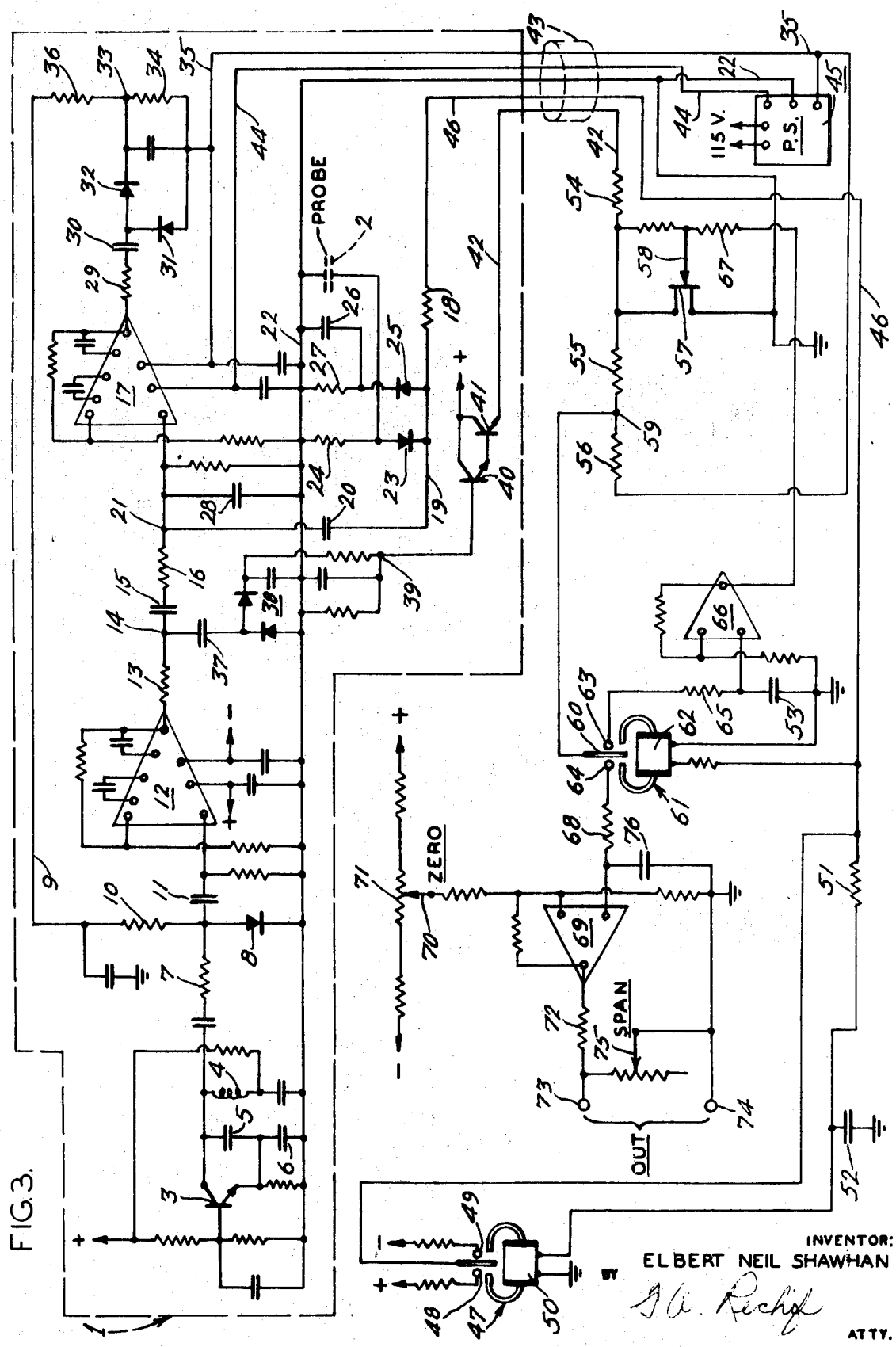

A detailed description of the invention follows, taken in conjunction with the accompanying drawings, wherein:

FIGS. 1 and 2 are basic circuit diagrams useful in explaining the operation of the invention; and FIG. 3 is a circuit schematic of a complete capacitance measuring apparatus according to this invention.

The apparatus of this invention is rooted upon some basic concepts of electrical capacitance. The relation between the charge on the plates of a capacitor and the potential between them is determined solely by plate geometry and the electrical properties of the material filling the intervening space. If this charge results from the flow of alternating current of fixed frequency, the voltage across the capacitor is proportional to the ratio of current to capacitance. With the current regulated to maintain constant voltage across the capacitor, the current is a measure of the capacitance value.

Refer first to FIG. 1, which represents a basic circuit utilized in the invention. In this circuit, if voltage V is controlled in such a way as to maintain or hold voltage $V_C$ constant as C varies, the ratio of current I to $C\omega$ must remain constant. I is proportional to $V-V_C$ (which is the voltage across R), so is proportional to V for $V_C$ much smaller than V. Voltage V can thus be used as a measure of the capacitance C, as the latter varies.

FIG. 2 is a schematic of a rather fundamental circuit for the control of voltage V. Using the notation of FIG. 2, a net positive voltage at point P causes conduction through diode D and lowers the input to amplifier A-1 until equilibrium is restored and the potential of point P is limited to a few tenths of a volt. This means, in effect, that the voltage $V_C$ (input to amplifier a-2) is held substantially constant. Then, $$V_C = I/C\omega = E/G \quad (1)$$

Also, $$I = V/\sqrt{R^2 + (1/C\omega)^2}. \quad (2)$$

From (1) and (2), $$V = (E/G)\sqrt{(RC\omega)^2 + 1}. \quad (3)$$

For $RC\omega$ much greater than 1, $$V = (ER\omega/G) \times C \quad (4)$$

Equation (4) is accurate within 1 percent for $RC\omega$ greater than 7, and accurate within 0.1 percent for $RC\omega$ greater than 22. For example, with $\omega = 10^6$ and $R = 10^5$, V is linear with C within 1 percent for values of C greater than 70 pf., and within 0.1 percent for values of C greater than 220 pf.

The maximum value of V is limited by the saturation level of amplifier a-1, which may be about 25 volts peak-to-peak. The capacitance C corresponding to maximum voltage V is determined by the product $ER\omega$, divided by G, Equation (4). With $E = 15$ volts, $R = 10^5$ ohms, $f = 10^5$ Hz. ($\omega = 2\pi f = 6.28 \times 10^5$), and $G = 100$, the maximum capacitance is in excess of 2,600 pf. These values make V linear with capacitance to 0.1 percent over a span of more than 2,000 pf. Voltage V changes 0.95 volts per 100 pf. For narrow spans, R could be increased to 1 megohm, making the calibration factor 0.95 volts per 10 pf.

Available solid-state components, including integrated circuits, make it practical to mount most of the circuit near the capacitive probe, thus avoiding the problems arising from the transmission of high-frequency signal current over long transmission lines.

FIG. 3 is a circuit schematic of a complete capacitance measuring apparatus according to this invention. In FIG. 3, the upper portion of the circuit, inside the dotted line enclosure 1, can be mounted on or near the capacitive probe 2. Although the probe 2 is indicated as being within the enclosure 1, in most instances it would actually be located outside this enclosure.

The sinusoidal measuring current is generated by transistor 3 connected as a Colpitts oscillator at a frequency $f = \omega/2\pi$ of 100 kHz., for example, this frequency being determined by inductor 4, capacitor 5, and capacitor 6. The output voltage of the oscillator is attenuated by a voltage divider formed by a series resistor 7 and a shunt diode 8. Diode 8 corresponds to diode D of FIG. 2, and the resistance of this diode is determined by the bias applied thereto by way of a lead 9 and a resistor 10, as will be described further hereinafter.

The attenuated output of the oscillator 3 is fed through a coupling capacitor 11 to the input of an amplifier 12. The amplifier 12 is of the integrated circuit type, and corresponds to amplifier A-1 of FIG. 2. The gain of amplifier 12 must be sufficient so the voltage across diode 8 never introduces excessive waveform distortion due to curvature of the diode characteristic.

The amplified output of 12 is fed through a small resistor 13 to a point 14, and thence through a capacitor 15 and a resistor 16 to a point 21 at the input of an amplifier 17. Amplifier 17 is also of the integrated circuit type, and corresponds to amplifier A-2 of FIG. 2 (its gain is G). Resistor 16 is the current-limiting resistor corresponding to R of FIG. 2.

A low-frequency switching voltage (2 Hz. square wave, for example, on the order of 15 volts positive with respect to ground 22 during one half-cycle and 15 volts negative with respect to ground during the other half-cycle) is obtained from a remotely located power supply as will be described, and is fed through a resistor 18 to a conductor 19, this conductor being coupled through a capacitor 20 to point 21 located at the amplifier 17 end of resistor 16. Between the conductor 19 and ground 22, a diode 23 is connected in series with two parallel-arranged branches, in one of which there is the capacitance 2 provided by the measuring probe or measuring capacitor and in the other of which there is a resistor 24. Also connected between the conductor 19 and ground is a diode 25 in series with two parallel-arranged branches, in one of which there is a fixed, reference capacitor 26 and in the other of which there is a resistor 27. It will be noted that diodes 23 and 25 are poled oppositely with respect to each other. The arrangement is such that the capacitances at 2 and 26 are of the same order of magnitude. The main purpose of the circuitry of this invention is to measure the capacitance 2 which is presented between the electrodes of the measuring probe; this capacitance is proportional to some physical quantity the measurement of which is desired.

It may be noted that the low-frequency switching voltage provided on conductor 19 is applied to the diodes 23 and 25. During the half-cycle of the switching voltage when conductor 19 is positive with respect to ground, diode 25 will be conductive and diode 23 nonconductive. This situation is reversed during the other half-cycle, when conductor 19 is negative with respect to ground. The result, accordingly, is that during one half-cycle of the switching voltage, the capacitor 26 will be effectively in the circuit (and will be in effect coupled to point 21), while the capacitance 2 provided by the measuring probe will be out of the circuit. This condition is reversed during the other half-cycle of the switching voltage. For the present, let us assume that the measuring capacitance 2 is in the circuit; that is, let us consider the action occurring during the half-cycle of the switching voltage when conductor 19 is negative with respect to ground. The voltage from point 21 to ground corresponds to voltage $V_C$ of FIG. 2, and the capacitance from this same point to ground is the capacitance which is to be measured.

A capacitor 28, connected from point 21 to ground 22, assures that the measured capacitance cannot be below the linear portion of the capacitance-voltage curve. The voltage from point 21 to ground (which is in effect the voltage $V_C$ across C of FIG. 2) is amplified by amplifier 17 and is fed through a small resistor 29 and a coupling capacitor 30 to a pair of diodes 31 and 32 which are connected in rectifying fashion between capacitor 30 and a point 33 which corresponds to point P of FIG. 2. The point 33 is coupled by way of a resistor 34 to the negative power supply lead 35, which corresponds to the negative supply voltage E (reference voltage) of FIG. 2. The point 33 is connected through a resistor 36 to lead 9, previously mentioned.

The voltage from point 21 to ground is amplified by amplifier 17 and rectified by diodes 31 and 32. The DC voltage at point 33 in excess of the negative supply voltage 35 effective at this point controls the resistance of diode 8. Specifically, a net positive voltage at point 33 causes conduction through diode 8 and lowers the input to amplifier 12 until equilibrium is restored. Thus, the potential of point 33 is limited to a few tenths of a volt. This means that the peak-to-peak voltage at the output of amplifier 12 (which is the voltage from point 14 to ground, and which is V of FIG. 2), is controlled to maintain $V_C$, the voltage from point 21 to ground, substantially constant as the capacitance 2 of the probe varies.

The voltage V (which is the voltage from point 14 to ground, and which according to the previously described theory is used as a measure of C, the capacitance from point 21 to ground when the probe capacitance 2 is switched into the circuit) is taken off from point 14 and applied by way of a coupling capacitor 37 to a diode network 38 operating as a peak-to-peak rectifier. The rectified voltage is taken off from the output terminal 39 of network 38 and fed through a pair of transistors 40 and 41 connected as cascaded emitter followers to a signal lead 42 which is one of the wires in a cable 43 connecting the components within enclosure 1 (located immediately adjacent the measuring probe 2) to a remote power supply and recording unit, hereinafter described.

From Equation (4) above, the slope of the line relating C to V is proportional to E, R, and $\omega$ and inversely proportional to G, the gain of amplifier 17. Stability of the voltage vs. capacitance calibration depends on the invariance of the factor $ER\omega/G$.

In normal service, ambient temperature near the probe 2 may vary between +125° and −40° F. E, R,$\omega$ and G can be held within narrow limits over this temperature range by choice of circuit components with low temperature coefficients. However, with the best components the drift with temperature could be appreciable on a narrow span. Supplemental compensation is essential for optimum operation.

According to this invention, a fixed reference capacitor 26 (dimensionally stable with temperature) is periodically (at the frequency switching rate) switched into the circuit, in place of the measuring capacitor 2. This switching action has been described previously. When this switching occurs, the circuit in enclosure 1 operates in exactly the same manner as previously described for the capacitor 2, to produce a voltage V' at point 14 which will be constant if there has been no change in the slope of the voltage-capacitance line (characteristic). This voltage V' is compared (during this same half-cycle of the switching voltage) with a stable reference voltage and the difference or error voltage (if any) is used to adjust the value of a voltage-variable resistor in an attenuating network through which the voltage V being measured is fed (during the other half-cycle of the switching voltage). This provides the required compensation for drift due to aging or temperature, as will be described hereinafter.

The voltage comparison and compensation action just described is effected in a recording and control unit, which is illustrated below the enclosure 1 in FIG. 3 and which may be located remotely from the sensing and measuring unit of this enclosure. Five wires contained in a cable 43 connect the sensing and measuring unit 1 with the power supply, recording and control unit now to be described. The negative power supply lead 35 (15 volts), the ground lead 22, and a positive power supply lead 44 (also 15 volts) comprise three of these wires, these wires of the cable being connected respectively to the three output terminals of a regulated power supply 45 in the recording and control unit.

Another wire 46 of the cable 43 carries the switching voltage which is fed to conductor 19. The low-frequency switching voltage is generated by means of a polarized relay 47 whose two fixed contacts 48 and 49 are coupled respectively to the positive and negative output terminals of the power supply 45, and whose movable contact is connected to wire 46; the coil 50 of relay 47 is connected to wire 46 through a resistor 51, a nonpolar capacitor 52 being connected from the common junction of coil 50 and resistor 51 to ground. The arrangement including relay 47 operates in more or less conventional fashion to develop on wire 46 an approximately square wave (frequency about 2 Hz.) switching voltage which is 15 volts positive during one half-cycle and 15 volts negative during the other half-cycle.

The four wires 22, 35, 44, and 46 may be common to a number of remote sensing and measuring units such as 1.

The fifth wire of cable 43 is the signal lead 42. In the recording and control unit, lead 42 is coupled through three series-connected resistors 54, 55, and 56 connected as a voltage divider to the negative lead 35 (−15 volts) of the power supply 45. Between the common junction of resistors 54 and 55 and ground, there is inserted the resistance provided by a field effect transistor 57 operating as a voltage-variable or voltage-adjustable resistor whose resistance value is adjustable in accordance with the voltage applied to its gate electrode 58. Thus, the field effect transistor 57 provides an arrangement whereby the signal appearing on signal lead 42 may be variably attenuated.

Output is taken from the voltage divider-attenuator arrangement 54–57 at point 59, which is the common junction of resistors 55 and 56, and is applied to the movable contact 60 of a polarized relay 61 whose coil 62 is energized from the switching voltage lead 46 and is thus caused to operate at the low switching frequency. That is to say, the movable relay contact 60 moves back and forth between the two fixed relay contacts 63 and 64 at the switching frequency rate, contact 60 engaging contact 63 during one half-cycle of the switching voltage and contact 60 engaging contact 64 during the other half-cycle of the switching voltage. Thus, the operation of relay 61 is synchronized with the operation of the diode switching arrangement 23, 25 in the enclosure 1. Specifically, the arrangement is such that contact 60 engages contact 63 during the same half-cycle of the switching voltage as diode 25 switches the reference capacitor 26 into the circuit, and during the other half-cycle (when diode 23 switches the measuring capacitor 2 into the circuit), contact 60 engages contact 64.

Contact 63 is coupled over a resistor 65 to the input of an amplifier 66 (solid-state, integrated circuit type) the output of which is applied through a resistor 67 to the gate electrode 58 of the field effect transistor 57 as a controlling (adjusting, varying) voltage therefor. A storage capacitor 53 is connected between the amplifier end of resistor 65 and ground.

The signal voltage from the sensing and measuring unit 1 alternates between two levels at the switching frequency rate. Voltage due to either the reference capacitor 26 or probe capacitor 2 may be larger. The reference voltage level always corresponds to a fixed reference capacitor, but may vary in value with circuit component changes. This reference voltage is divided to a lower value by resistors 54 and 57 (the field effect transistor 57 operating as a variable resistor, as previously stated) and compared with a known, constant voltage (supplied by lead 35 to the end of resistor 56 opposite to point 59) which may also be the reference voltage (corresponding to E in FIG. 2) for the sensing unit 1.

During the "reference" half-cycle of the switching voltage (i.e., when the reference capacitor 26 is connected into the circuit, and also when contact 60 engages contact 63), the voltage V' produced at point 14 is rectified and applied to signal lead 42. The net voltage (resulting from the comparison previously mentioned) at point 59 is averaged and stored on capacitor 53, causing a negative bias to be applied through amplifier 66 to the field effect transistor gate 58, which adjusts the resistance of the variable resistor 57 (field effect transistor) so that the voltage at point 59 is very small. The function of the reference capacitor 26 and the reference voltage (supplied from lead 35 to one end of resistor 56) is to regulate the resistance of resistor 57 so that the slope of the (linear) voltage-capacitance characteristic is maintained constant (thus counteracting or nullifying circuit component changes) by holding one point on the line (characteristic) constant.

Contact 64 is coupled over a resistor 68 to the "direct" input of a differential amplifier 69 (solid-state, integrated circuit type). A storage capacitor 76 is connected between the amplifier end of resistor 68 and ground.

During the "measuring" half-cycle of the switching voltage (i.e., when the probe capacitance 2 is connected into the circuit, and also when contact 60 engages contact 64), the small voltage (at point 59) previously referred to is retained on capacitor 53, so that the resistance of resistor 57 remains unchanged. Therefore, the voltage fed to amplifier 69 is always related to the capacitance of probe 2 by the constant-slope (linear) voltage-capacitance characteristic.

A "zero" control or adjustment 70, provided by the movable contact on a potentiometer 71 connected across the output of power supply 45, furnishes an adjustable voltage which may be zero (ground), positive, or negative to the "inverting" input of the differential amplifier 69, in phase opposition to the "direct" input provided from contact 64.

During the "measuring" half-cycle of the switching voltage (i.e., when the probe capacitance 2 is connected into the circuit), the voltage V (proportional to C) produced at point 14 is rectified and applied to signal lead 42, and thence through the network 55–57, etc., (wherein its magnitude is automatically compensated, as necessary) and through relay contact 64 to the "direct" input of amplifier 69. The zero control 70 differentially adds a voltage as adjusted to the "direct" input voltage (signal voltage) proportional to capacitance.

The output of amplifier 69 is applied through a resistor 72 to a pair of terminals 73 and 74 (terminal 74 being grounded) which are denoted "Out" and to which a recorder may be connected. A span control or adjustment 75, which may be a potentiometric-type variable resistor, is provided across output terminals 73 and 74. The "span" and "zero" controls 75 and 70, respectively, operate without interaction. By addition of a standard voltage-to-current converter, current can be supplied for any current actuated device, such as a control device.

Amplifier 69 provides a low impedance to drive the recorder, or control device. The signal on the "direct" input of amplifier 69, and the "zero" voltage on the "inverting" input of this same amplifier, are amplified independently if their difference does not exceed 10 volts.

The invention claimed is:

1. Capacitance-measuring apparatus comprising a source of alternating excitation current, a resistor and a variable capacitor coupled together in series relation across said source, the impedance of said resistor being large as compared with the impedance of said capacitor, whereby the alternating voltage $V_c$ across said capacitor is much less than the alternating voltage V across the series combination; means for automatically controlling V to maintain $V_c$ substantially constant as the capacitance of said capacitor varies, and means for utilizing V as an indication of the value of said capacitance.

2. Apparatus of claim 1, wherein the first-mentioned means includes an amplifier, means for applying the voltage $V_c$ as input to said amplifier, a voltage-controllable attenuating device connected between said source and said series combination, and means for applying a voltage obtained from the output of said amplifier to said device to control the attenuation factor thereof.

3. Apparatus recited in claim 2, wherein said attenuating device comprises a diode shunted across the connections between said source and said series combination.

4. Apparatus of claim 1, wherein the first-mentioned means includes a first amplifier, means for applying the voltage $V_c$ as input to said amplifier, a second amplifier having its input coupled to said source and its output coupled to said series combination; a voltage-controllable attenuating device in the coupling between said source and the input of said second amplifier, and means for applying a voltage obtained from the output of said first amplifier to said device to control the attenuation factor thereof.

5. Apparatus recited in claim 4, wherein said attenuating device comprises a diode connected across the coupling between said source and the input of said second amplifier.

6. Capacitance-measuring apparatus comprising a source of alternating excitation current, a resistor and a variable capacitor coupled together in series relation across said source, the impedance of said resistor being large as compared with the impedance of said capacitor, whereby the alternating voltage $V_c$ across said capacitor is much less than the alternating voltage V across the series combination; means for automatically controlling V to maintain $V_c$ substantially constant as the capacitance C of said capacitor varies, the product of C times the resistance of said resistor times the angular velocity of said source being much greater than one, whereby a substantially linear V vs. C characteristic is obtained; means for automatically and continuously correcting the slope of said characteristic to maintain it substantially invariant, and means for utilizing V as an indication of the value of C.

7. Apparatus of claim 6, wherein the second-mentioned means includes means for periodically substituting for said variable capacitor, in said series combination, a fixed reference capacitor.

8. Apparatus defined in claim 6, wherein the third-mentioned means includes a voltage-responsive attenuator through which a voltage representative of V is fed; and wherein the second-mentioned means includes means for developing an error voltage proportional to deviations from a fixed value in the slope of said characteristic, and means for applying said error voltage to said attenuator to vary the attenuation factor thereof.

9. Apparatus defined in claim 6, wherein the third-mentioned means includes a voltage-responsive attenuator through which a voltage representative of V is fed; and wherein the second-mentioned means includes means for periodically substituting for said variable capacitor, in said series combination, a fixed reference capacitor, thereby to produce an alternating voltage V' across the series combination of said reference capacitor and said resistor, means for developing from V' an error voltage proportional to deviations thereof from a fixed value, and means for applying said error voltage to said attenuator to vary the attenuation factor thereof.

10. Apparatus of claim 6, wherein the first-mentioned means includes an amplifier, means for applying the voltage $V_C$ as input to said amplifier, a voltage-controllable attenuating device connected between said source and said series combination, and means for applying a voltage obtained from the output of said amplifier to said device to control the attenuation factor thereof.

11. Apparatus recited in claim 10, wherein said attenuating device comprises a diode shunted across the connections between said source and said series combination.

12. Apparatus defined in claim 6, wherein the first-mentioned means includes an amplifier, means for applying the voltage $V_C$ as input to said amplifier, a voltage-controllable attenuating device connected between said source and said series combination, and means for applying a voltage obtained from the output of said amplifier to said device to control the attenuation factor thereof; and wherein the second-mentioned means includes means for periodically substituting for said variable capacitor, in said series combination, a fixed reference capacitor.

13. Apparatus recited in claim 12, wherein said attenuating device comprises a diode shunted across the connections between said source and said series combination.

14. Apparatus defined in claim 6, wherein the first-mentioned means includes an amplifier, means for applying the voltage $V_C$ as input to said amplifier, a voltage-controllable attenuating device connected between said source and said series combination, and means for applying a voltage obtained from an output of said amplifier to said device to control the attenuation thereof; wherein the third-mentioned means includes a voltage-responsive attenuator through which a voltage representative of V is fed; and wherein the second-mentioned means includes means for developing an error voltage proportional to deviations from a fixed value in the slope of said characteristic, and means for applying said error voltage to said attenuator to vary the attenuation factor thereof.

15. Apparatus recited in claim 14, wherein said attenuating device comprises a diode shunted across the connections between said source and said series combination.

* * * * *